United States Patent
Kim et al.

(10) Patent No.: US 6,320,637 B1
(45) Date of Patent: Nov. 20, 2001

(54) LIQUID CRYSTAL DISPLAY WITH WIDE VIEWING ANGLE

(75) Inventors: Hyang Yul Kim; Seung Hee Lee, both of Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/428,625

(22) Filed: Oct. 27, 1999

(30) Foreign Application Priority Data

Oct. 29, 1998 (KR) .................................................. 98-45782

(51) Int. Cl.$^7$ .................................................. G02F 1/1333
(52) U.S. Cl. ........................................... 349/141; 349/144
(58) Field of Search ..................................... 349/144, 141

(56) References Cited

U.S. PATENT DOCUMENTS

| | | | |
|---|---|---|---|
| 4,691,200 | 9/1987 | Stephany | 340/784 |
| 4,944,578 | 7/1990 | Denison | 350/347 |
| 5,091,784 | 2/1992 | Someya et al. | 358/183 |
| 5,268,777 | 12/1993 | Sato | 359/57 |
| 5,956,060 | * 8/1999 | Nishiki et al. | 349/141 |
| 6,222,599 | * 4/2001 | Yoshida et al. | 349/141 |

FOREIGN PATENT DOCUMENTS

| | | | |
|---|---|---|---|
| 08015677 | 1/1996 | (JP) | G02F/1/1333 |
| 08036193 | 2/1996 | (JP) | G02F/1/136 |
| 10221715 | 8/1998 | (JP) | G02F/1/136 |
| 08313938 | 11/1996 | (JP) | G02F/1/137 |
| 08314414 | 11/1996 | (JP) | G09G/3/36 |
| 08335685 | 12/1996 | (JP) | H01L/27/14 |

\* cited by examiner

*Primary Examiner*—James A. Dudek
(74) *Attorney, Agent, or Firm*—Ladas & Parry

(57) ABSTRACT

A wide viewing angle liquid crystal display, comprising: a lower and an upper substrates being opposed with interleaving a liquid crystal layer including liquid crystal molecules; a data bus line and a gate bus line being arranged over the lower substrate and being arranged to be perpendicularly crossed with each other to form an unit pixel region, the unit pixel region being divided into a first region and a second region along the data bus line; a switching devices being arranged at an intersection of the data bus line and the gate bus line; first and second counter electrodes; and a pixel electrodes being arranged in the unit pixel region over the first counter electrode, which a display signal is applied thereto, wherein when the switching device is turned on, the liquid crystal molecules in the unit pixel region twistedly arranged and when the switching device is turned off, an electric field perpendicular to a surface of the lower surface is generated in the first region of the unit pixel region and at the same time, an electric field parallel to the surface of the lower substrate is generated in the second region of the unit pixel region.

14 Claims, 4 Drawing Sheets

LIQUID CRYSTAL DISPLAY WITH WIDE VIEWING ANGLE

BACKGROUND OF THE INVENTION

This invention relates to a liquid crystal display (LCD) with a wide viewing angle, and more particularly to a LCD being capable of obtaining a wide viewing angle by simultaneously generating electric fields parallel and perpendicular to a surface of a substrate within an unit pixel area.

An in plane switching (IPS) mode LCD is developed by Hitachi, Ltd., in Japan so as to compensate the viewing angle of a TN mode LCD, which is disclosed in Asia display '95, p 577–850, "Principle and characteristic of electro-optical behaviour with in-plane switching mode". In the IPS mode LCD, as shown in FIG. 1, electrodes 2a and 2b being spaced with each other are arranged on the same front surface of the substrate 1. An homogeneous alignment layer (not shown) is formed over the front surface of the substrate where the electrodes 2a and 2b are arranged. The homogeneous alignment layer is rubbed to make a predetermined angle, for example an angle of 45 degrees with the electrons 2a and 2b. Although not shown in FIG. 1, a first polarizer which has the same polarization axis as a rubbing direction of the homogeneous alignment layer, is disposed over a rear surface of the substrate and a second polarizer which has a polarization axis parallel to the polarization axis of the first polarizer, is disposed over a rear surface of an opposite substrate.

The operation of the IPS mode LCD will be described as follows. First, if a voltage is not applied to the electrodes 2a and 2b, liquid crystal (LC) molecules 3 are arranged to make the longitudinal axes of LC molecules 3 to be in parallel to the rubbing direction of the homogeneous alignment layer. Accordingly, the picture of the LCD becomes dark state.

On the other hand, if a voltage is applied to the electrodes 2a and 2b, an electric field is generated between the electrodes 2a and 2b. Because the electrodes 2a and 2b are disposed over the same substrate, the direction of the electric field is in parallel to the surface of the substrate. According to this, LC molecules which are arranged in the rubbing direction of the homogeneous alignment layer, are twisted in the clockwise direction to make the longitudinal axes of the LC molecules to be in parallel to the direction of the electric field, if LC molecules are positive dielectric anisotropy. Therefore, the picture of the LCD becomes white state.

However, when an electric field is generated, that is when it is a white state, color of the picture in the prior IPS mode LCD becomes different according to the viewing angle due to the anisotropy of reflection index of the LC molecules. More detailedly speaking, when one views the picture of the IPS mode LCD in the X direction of FIG. 1, the one views the short axes of the LC molecules so that the picture of the LCD brings out blue color having a short wavelength rather than white color.

On the other hand, when one views the picture of the IPS mode LCD in the Y direction, the one views the longitudinal axes of the LC molecules 3b so that the picture of the LCD brings out yellow color having a long wavelength rather than white color. Therefore, the picture quality of the IPS mode LCD becomes degraded due to the color shift phenomenon. The above color shift phenomenon is detailedly disclosed in SID '97, p 929–932.

SUMMARY OF THE INVENTION

It is an object of the present invention to provide a LCD with a wide viewing angle being capable of preventing the color shift in a white state.

According to an aspect of the present invention, there is provided to a wide viewing angle liquid crystal display, comprising: a lower and an upper substrates being opposed with interleaving a liquid crystal layer; a data bus line and a gate bus line being arranged over the lower substrate and being arranged to be perpendicularly crossed with each other to form an unit pixel region, the unit pixel region being divided into a first region and a second region; a switching devices being arranged at an intersection of the data bus line and the gate bus line; first and second counter electrodes; and a pixel electrodes being arranged in the unit pixel region, which a display signal is applied thereto, wherein when the switching device is turned on, the liquid crystal molecules in the unit pixel region twistedly arranged and when the switching device is turned off, an electric field perpendicular to a surface of the lower surface is generated in the first region of the unit pixel region and at the same time, an electric field parallel to the surface of the lower substrate is generated in the second region of the unit pixel region.

There is also provided to a wide viewing angle liquid crystal display, comprising: a lower and an upper substrates being opposed with interleaving a liquid crystal layer; a data bus line and a gate bus line being arranged over a front surface of the lower substrate and being arranged to be perpendicularly crossed with each other to form an unit pixel region, the unit pixel region being divided into a first region and a second region; a switching device being arranged at an intersection of the data bus line and the gate bus line; a pixel electrode being connected to the switching device, which a display signal is applied thereto in turning the switching device on; and first and second counter electrodes forming electric fields with the pixel electrode, wherein in the first region of the unit pixel region, the pixel electrode and the first counter electrode are disposed in the lower and upper substrates, respectively to be opposed with interleaving the liquid crystal layer and in the second region of the unit pixel region, the pixel electrode and the second counter electrode are alternatively disposed over the same substrate.

There is further provided to a wide viewing angle liquid crystal display, comprising: a lower and an upper substrates being opposed with interleaving a liquid crystal layer; a data bus line and a gate bus line being arranged over a front surface of the lower substrate and being arranged to be crossed with each other to form an unit pixel region, the unit pixel region being divided into first region and the second region; a switching device being arranged at an intersection of the data bus line and the gate bus line; a first counter electrode being arranged in the unit pixel region over the front surface of the lower substrate, the first counter electrode having a frame structure; a pixel electrode being arranged in the unit pixel region over the first counter electrode, the pixel electrode including a sheet portion being formed in the first region of the unit pixel region and a rod portion being formed in the second region of the unit pixel region; a second counter electrode disposed over a portion of the upper substrate corresponding to the unit pixel region, the second counter electrode including a sheet portion being formed at the portion of the upper substrate corresponding to the first region and a frame portion being formed at the portion of the upper substrate corresponding to the second region; first and second alignment layers disposed over the lower and upper substrates, respectively; and first and second polarizers disposed over rear surfaces of the lower and upper substrates, respectively, wherein an electric field perpendicular to the surface of the substrate is generated between the sheet portion of the pixel electrode and the sheet portion of the second counter electrode and at the same time, an electric field parallel to the surface of the substrate is generated between the rod portion of the pixel electrode and the first counter electrode of the frame structure.

There is further still provided to a wide viewing angle liquid crystal display, comprising: a lower and an upper substrates being opposed with interleaving a liquid crystal layer;

a data bus line and a gate bus line being arranged over a front surface of the lower substrate and being arranged to be crossed with each other to form an unit pixel region, the unit pixel region being divided into first region and the second region; a switching device being arranged at an intersection of the data bus line and the gate bus line; a first counter electrode being arranged in the unit pixel region over the front surface of the lower substrate, the first counter electrode having a frame structure and including at least one or more than branches; a pixel electrode being arranged in the unit pixel region over the first counter electrode, the pixel electrode including a sheet portion being formed in the first region of the unit pixel region and one or more rods formed in the second region of the unit pixel region, the rods being arranged between the frame and the branches of the first counter; a second counter electrode disposed over a portion of the upper substrate corresponding to the unit pixel region, the second counter electrode including a sheet portion being formed at the portion of the upper substrate corresponding to the first region and a frame portion being formed at the portion of the upper substrate corresponding to the second region; first and second alignment layers disposed over the lower and upper substrates, respectively; and first and second polarizers disposed over rear surfaces of the lower and upper substrates, respectively, wherein an electric field perpendicular to the surface of the substrate is generated between the sheet portion of the pixel electrode and the sheet portion of the second counter electrode and at the same time, an electric field parallel to the surface of the substrate is generated between the rod portion of the pixel electrode and the first counter electrode of the frame structure.

According to the present invention, in applying a voltage to the unit pixel region, the electric fields parallel and perpendicular to field are simultaneously generated to remove the color shift, thereby obtaining the wide viewing angle. The electric field perpendicular to the surface of the lower substrate is partially formed in the unit pixel region to improve the response time as compared with the prior IPS mode LCD. The electrodes are formed over an upper substrate to remove the static electricity with ease.

BRIEF DESCRIPTION OF THE DRAWINGS

The objects and features of the invention may be understood with reference to the following detailed description of an illustrative embodiment of the invention, taken together with the accompanying drawings in which.

DETAILED DESCRIPTION OF THE INVENTION

Figure 1:
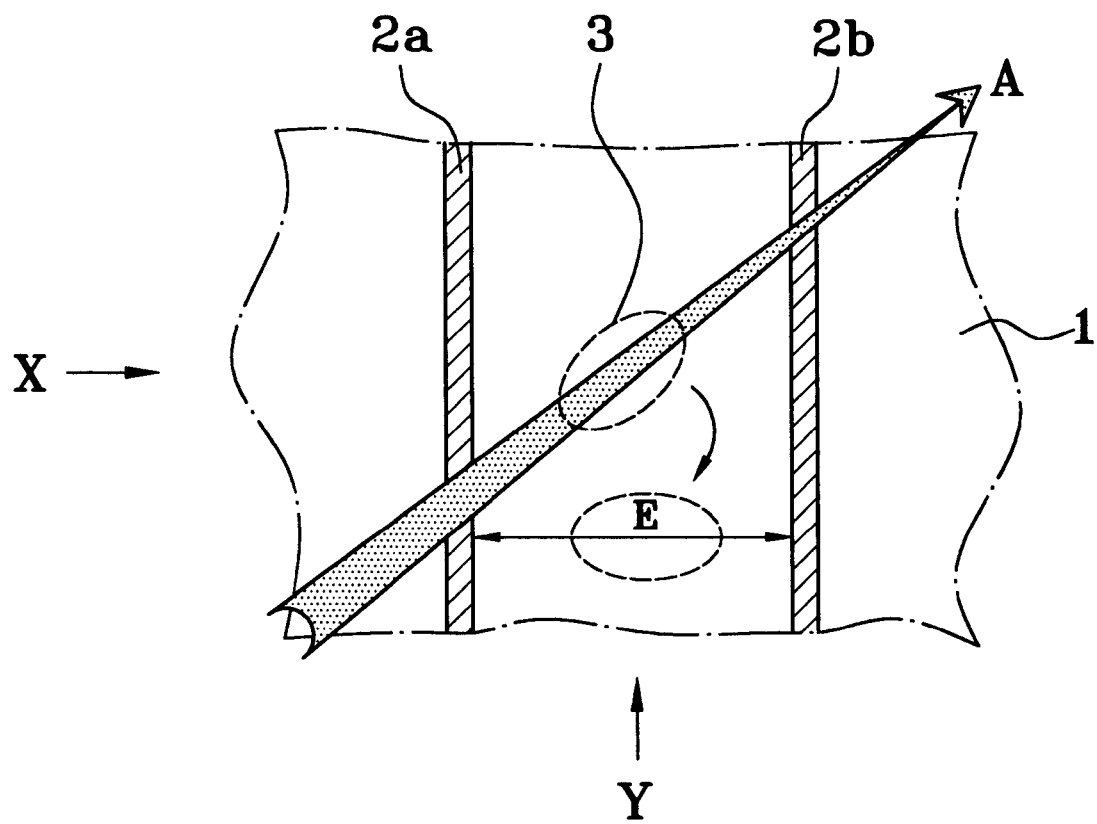
FIG. 1 is a diagram illustrating the principle for driving a prior IPS mode LCD.
Figure 2:
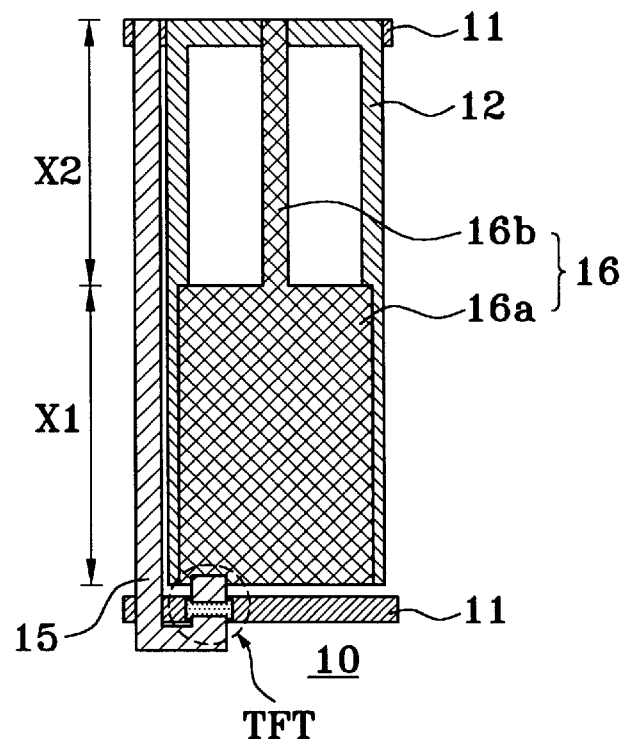
FIG. 2 is a plane view of a lower substrate of a LCD in accordance with an embodiment of the present invention.
Figure 3:
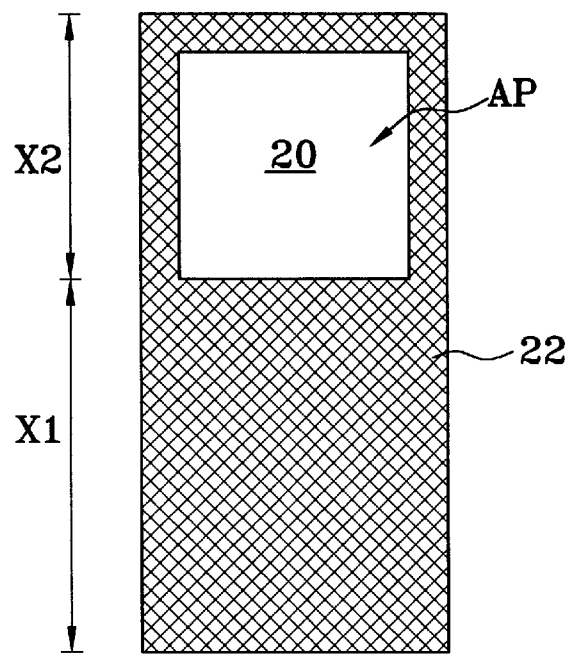
FIG. 3 is a plane view of an upper substrate of a LCD in accordance with an embodiment of the present invention.

FIG. 2 and FIG. 3 are plane views of a lower substrate and an upper substrate, respectively, in accordance with an embodiment of the present invention. A plurality of data bus lines 15 and a plurality of gate bus lines 11 are formed in a front surface of a lower substrate to be crossed with each other to form unit pixel regions with a matrix form. In FIG. 2, so as to describe one unit pixel region, only one data bus line and one gate bus line are shown. Herein, the gate bus line 11 and the data bus line 13 are insulated by a gate insulating layer (not shown). The gate bus line is disposed over the front surface of a lower substrate 10. The data bus line 15 is disposed over the gate insulating layer which is formed over the front substrate of the lower substrate 10 including the gate bus line 11. The gate bus line 11 and the data bus line may be comprised of a material having comparatively good conductivity, such as MoW or aluminum alloy.

At intersections of the gate bus lines 11 and the data bus lines, a plurality of thin film transistor (TFT) as switching devices are disposed, respectively. In any one unit pixel region defined by any one gate bus line 11 and any one data bus line 15, a first counter electrode 12 having a frame type, preferably a square frame type, which is spaced with the gate bus line 11 and the data bus line 15 defining the pixel region. Because the same voltage is applied to all the first counter electrodes which are respectively disposed within the unit pixel regions, the first counter electrodes 12 disposed in the adjacent unit pixel regions are connected to each other. The first counter electrode 12 is comprised of the same material as the gate bus line and is simultaneously formed with the gate bus line 11. In this embodiment, each of the unit pixel regions is divided into two portions along the gate line direction, an upper portion X1 being a first region and a lower portion X2 being a second region.

A pixel electrode 16 which a display signal, that is a data bus line signal is applied thereto is disposed to be contacted with the TFT in each of the unit pixel regions where the first counter electrode 12 is formed. At this time, the pixel electrode 16 has a piston rod structure. The pixel electrode 16 includes a first pixel electrode portion 16a which has a structure of a square sheet and is formed in the first region X1 of each of the unit pixel region and a second pixel electrode portion 16b which has a rod structure and is formed to be united with the first pixel electrode portion 16a parallel to the data bus line 15 in the second region X2. Preferably, the first pixel electrode portion 16a may be disposed near the TFT for selecting corresponding unit pixel region. The pixel electrode 16 is comprised of a transparent conducting material such as indium tin oxide (ITO).

Over a front surface of an upper substrate 20 which is opposed to the lower substrate 10 and color filters (not shown) are formed therein, a second counter electrode 22 is formed. The second electrode 22 has a square sheet having an opening AP at the portion corresponding to the second region X2 of the unit pixel region. Considering the aperture ratio, the second counter electrode 22 may be comprised of a transparent conducting material. The same common signal is applied to the first and second counter electrodes 12 and 22.

Alignment layers (not shown) for determining an initial alignment of LC molecules are respectively formed over the front surfaces of the lower and upper substrates 10 and 20. The alignment layers are homogeneous alignment layers having predetermined pretilt angles. The first homogeneous alignment layer which is formed over the front surface of the lower substrate 10, is rubbed to make a predetermined angle, for example, ±45° with the data bus line 20. The second homogeneous alignment layer which is formed over the front surface of the upper substrate 20, is rubbed in the direction which is crossed with the rubbing direction of the first alignment layer.

Polarizers for filtering the incident light in the constant direction, are respectively adhered to rear surfaces of the lower and upper substrates 10 and 20. At this time, the first polarizer which is adhered to the rear surface of the lower substrate 10, has the same polarization axis as the rubbing axis of the first homogeneous alignment layer and the second polarizer which is adhered to the rear surface of the upper substrate 20, has a polarization axis as the first polarizer.

The lower and upper substrates 10 and 20 are adhered to be opposed with each other and then LC is injected between the adhered lower and upper substrates.

Figure 4:
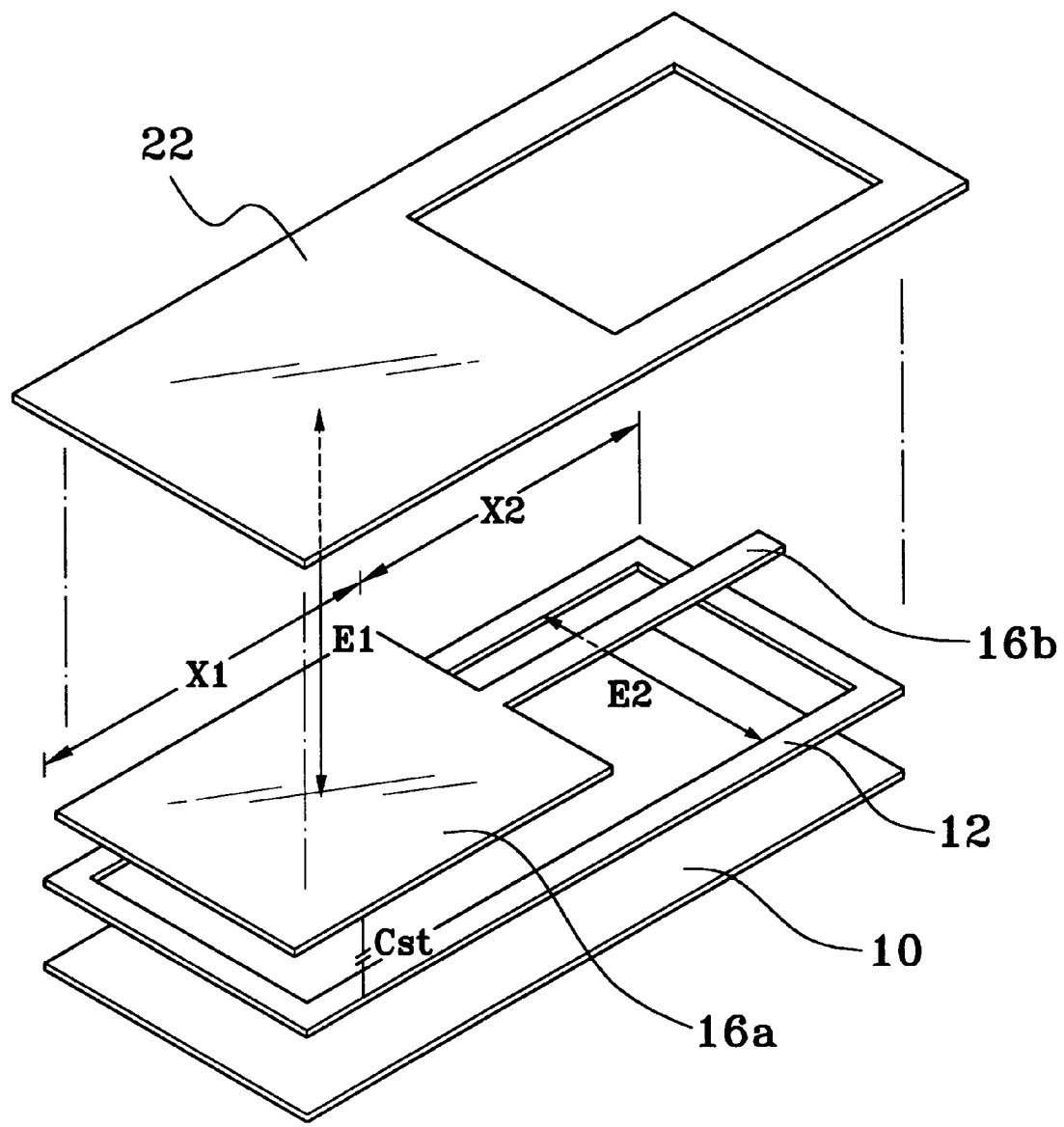
FIG. 4 is a diagram illustrating the structure of electrodes of a LCD in accordance with an embodiment of the present invention.

FIG. 4 shows the LCD having the electrode structure as above described in accordance with the one embodiment. First, when a common signal is not applied to the first and second counter electrodes 12 and 22 and a data display signal is not applied to the pixel electrode 16, the LC molecules are twistedly arranged with the crossed rubbing axes of the first homogeneous layer and the second homogeneous layer. The polarization axes of the first and second polarizers are arranged in parallel and the light incident from beneath the lower substrate is not passed through the second polarizer so that the picture of the LCD becomes dark state.

On the other hand, if a display signal is applied to the pixel electrode 16 and a common signal is the first and second counter electrodes 12 and 22, an electric field is generated between the pixel electrode 16 and the counter electrodes 12 and 22. At this time, the electric field E1 perpendicular to the surface of the substrate is generated between the first pixel electrode portion 16a of the pixel electrode 16 and the second counter electrode 22 in the first region X1 of the unit pixel region and the electric field E2 parallel to the surface of the substrate is generated between the second pixel electrode portion 16b of the pixel electrode 16 and the first counter electrode 12 in the second region X2 of the unit pixel region. Therefore, the electric fields E1 and E2 perpendicular and parallel to the surface of the substrate are simultaneously formed in the unit pixel region. Accordingly, when LC molecules are positive dielectric anisotropy, portions of LC molecules which are arranged in the first region X1, are arranged to make the longitudinal axes of the LC molecules to be in parallel to the electric field E1 perpendicular to the surface of the substrate and portions of the LC molecules which are arranged in the second region X2, are arranged to make the longitudinal axes of the LC molecules to be parallel to the electric field E2 parallel to the surface of the substrate, thereby forming two domains in one unit pixel region. Accordingly, the LC molecules are 3-dimensionally arranged and the reflection index of anisotropy of LC molecules becomes compensated so that the color shift is removed and the wide viewing angle is obtained.

Furthermore, the LC molecules in the first region X1 operate with TN mode and the LC molecules operate with IPS mode, so that the present invention can obtain the rapid response characteristic as the conventional TN mode LCD as well as the wide viewing angle as the conventional IPS mode LCD. The second counter electrode 22 is formed in the upper substrate 20 to remove the static electricity occurred in the upper substrate with ease.

Figure 5A:
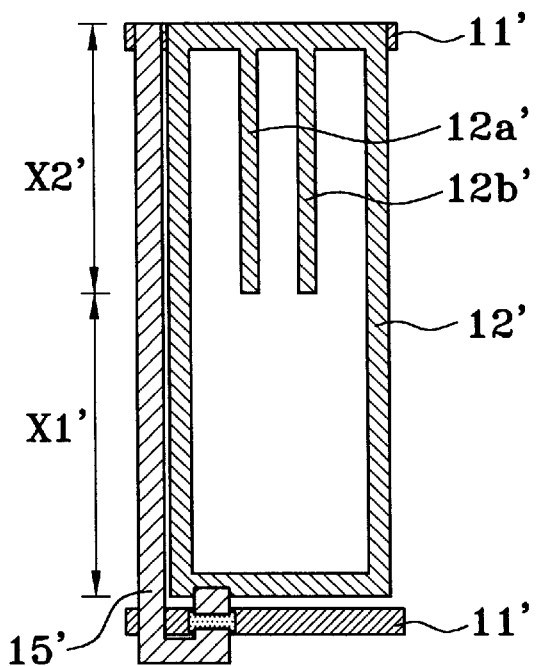
FIG. 5a and FIG. 5b are diagrams illustrating the structure of electrodes of a LCD in accordance with another embodiment of the present invention.
Figure 5B:
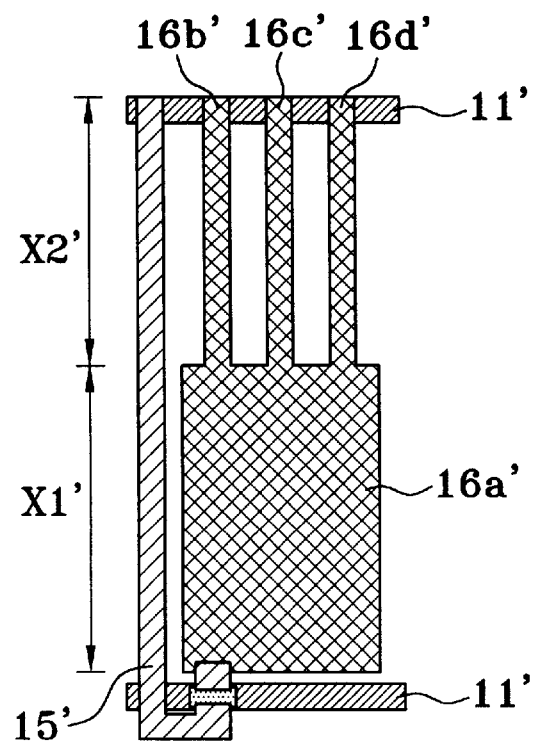

FIG. 5a and FIG. 5b show the structure of electrodes formed in a lower and an upper substrates of a LCD in accordance with another embodiment of the present invention. The LCD of another embodiment has the same structure as the LCD of the one embodiment. Merely, the first counter electrode 12' and the pixel electrode 16' formed in the unit pixel region have a different structure from those of the LCD in the one embodiment. The LCD of another embodiment us utilized when lower driving voltage is demanded as compared with the LCD of the one embodiment.

Referring to FIG. 5a, the first counter electrode 12' has a square frame structure. The first counter electrode 12' includes a plurality of branches, for example two branches 12a' and 12b' which are formed in an equal distance and in parallel to the data bus line. Referring to FIG. 5b, the pixel electrode 16' includes a square sheet 16a' formed in the first region X1' of the unit pixel region and a plurality of rods 16b', 16c' and 16d' formed to be united with the square frame in the second region X2' of the unit pixel region. The rods 16b', 16c' and 16d' are alternatively arranged with the branches 12a' and 12b'. A number of rod of the pixel electrode 16' is preferably one more than that of branch in the first counter electrode 12'. The rods in the pixel electrode 16' are arranged to be spaced with and to be in parallel to each other.

Accordingly, the distance between the counter electrode 12' and the pixel electrode 16' in the second region X2' of the unit pixel region as compared with the one embodiment becomes narrow and the intensity of the electric field parallel to the surface of the substrate between the first counter electrode 12' and the pixel electrode 16' is increased to lower the driving voltage.

According to the present invention, when a voltage is applied to the unit pixel, the electric fields perpendicular and parallel to the surface of the substrate are simultaneously generated in the unit pixel to remove the color shift and to obtain the wide viewing angle. The electric field perpendicular to the surface of the substrate is generated in the portion of the unit pixel region to improve response time as compared with the conventional IPS mode LCD.

While the invention has been particularly shown and described with respect to preferred embodiment thereof, it will be understood by those skilled in the art that various changes in form and details may be made therein without departing from the spirit and the scope of the invention as defined by the following claims.

What is claimed is:

1. A wide viewing angle liquid crystal display, comprising:
   a lower and an upper substrates being opposed with interleaving a liquid crystal layer;
   a data bus line and a gate bus line being arranged over the lower substrate and being arranged to be perpendicularly crossed with each other to form an unit pixel region, the unit pixel region being divided into a first region and a second region;
   a switching devices being arranged at an intersection of the data bus line and the gate bus line;
   first and second counter electrodes; and
   a pixel electrodes being arranged in the unit pixel region, which a display signal is applied thereto, wherein when the switching device is turned on, the liquid crystal molecules in the unit pixel region twistedly arranged and when the switching device is turned off, an electric field perpendicular to a surface of the lower surface is generated in the first region of the unit pixel region and at the same time, an electric field parallel to the surface of the lower substrate is generated in the second region of the unit pixel region.

2. The liquid crystal display as claimed in claim 1, wherein in the first region of the unit pixel region, the pixel electrode and the first counter electrode are disposed in the lower and upper substrates, respectively to be opposed with interleaving the liquid crystal layer and in the second region of the unit pixel region, the pixel electrode and the second counter electrode are alternatively disposed over the same substrate.

3. A wide viewing angle liquid crystal display, comprising:

a lower and an upper substrates being opposed with interleaving a liquid crystal layer;

a data bus line and a gate bus line being arranged over a front surface of the lower substrate and being arranged to be perpendicularly crossed with each other to form an unit pixel region, the unit pixel region being divided into a first region and a second region;

a switching device being arranged at an intersection of the data bus line and the gate bus line;

a pixel electrode being connected to the switching device, which a display signal is applied thereto in turning the switching device on; and first and second counter electrodes forming electric fields with the pixel electrode, wherein in the first region of the unit pixel region, the pixel electrode and the first counter electrode are disposed in the lower and upper substrates, respectively to be opposed with interleaving the liquid crystal layer and in the second region of the unit pixel region, the pixel electrode and the second counter electrode are alternatively disposed over the same substrate.

4. The liquid crystal display as claimed in claim 3, wherein first and second alignment layers are further formed over the front surfaces of the lower, respectively and upper substrates and the first alignment layer is rubbed to make a selected angle with the data bus line and the second alignment layer is rubbed in the direction perpendicular to a rubbing direction of the first alignment layer.

5. The liquid crystal display as claimed in claim 4, wherein an angle made by the rubbing direction of the lower substrate and the data bus line is ±45 degrees.

6. The liquid crystal display as claimed in claim 4, wherein a first and a second polarizers are further adhered to rear surfaces of the lower and upper substrates, respectively and the first polarizer has the same polarizing axis as the rubbing direction of the first alignment layer and the second polarizer has a polarizing axis parallel to the polarizing axis of the first polarizer.

7. A wide viewing angle liquid crystal display, comprising:

a lower and an upper substrates being opposed with interleaving a liquid crystal layer;

a data bus line and a gate bus line being arranged over a front surface of the lower substrate and being arranged to be crossed with each other to form an unit pixel region, the unit pixel region being divided into first region and the second region;

a switching device being arranged at an intersection of the data bus line and the gate bus line;

a first counter electrode being arranged in the unit pixel region over the front surface of the lower substrate, the first counter electrode having a frame structure;

a pixel electrode being arranged in the unit pixel region over the first counter electrode, the pixel electrode including a sheet portion being formed in the first region of the unit pixel region and a rod portion being formed in the second region of the unit pixel region;

a second counter electrode disposed over a portion of the upper substrate corresponding to the unit pixel region, the second counter electrode including a sheet portion being formed at the portion of the upper substrate corresponding to the first region and a frame portion being formed at the portion of the upper substrate corresponding to the second region;

first and second alignment layers disposed over the lower and upper substrates, respectively; and first and second polarizers disposed over rear surfaces of the lower and upper substrates, respectively, wherein an electric field perpendicular to the surface of the substrate is generated between the sheet portion of the pixel electrode and the sheet portion of the second counter electrode and at the same time, an electric field parallel to the surface of the substrate is generated between the rod portion of the pixel electrode and the first counter electrode of the frame structure.

8. The liquid crystal display as claimed in claim 7, wherein the first alignment layer is rubbed to make a selected angle with the data bus line and the second alignment layer is rubbed in the direction perpendicular to a rubbing direction of the first alignment layer.

9. The liquid crystal display as claimed in claim 8, wherein an angle made by the rubbing direction of the lower substrate and the data bus line is ±45 degrees.

10. The liquid crystal display as claimed in claim 7, wherein the first polarizer has the same polarizing axis as the rubbing direction of the first alignment layer and the second polarizer has a polarizing axis parallel to the polarizing axis of the first polarizer.

11. A wide viewing angle liquid crystal display, comprising:

a lower and an upper substrates being opposed with interleaving a liquid crystal layer;

a data bus line and a gate bus line being arranged over a front surface of the lower substrate and being arranged to be crossed with each other to form an unit pixel region, the unit pixel region being divided into first region and the second region;

a switching device being arranged at an intersection of the data bus line and the gate bus line;

a first counter electrode being arranged in the unit pixel region over the front surface of the lower substrate, the first counter electrode having a frame structure and including at least one or more than branches;

a pixel electrode being arranged in the unit pixel region over the first counter electrode, the pixel electrode including a sheet portion being formed in the first region of the unit pixel region and one or more rods formed in the second region of the unit pixel region, the rods being arranged between the frame and the branches of the first counter;

a second counter electrode disposed over a portion of the upper substrate corresponding to the unit pixel region, the second counter electrode including a sheet portion being formed at the portion of the upper substrate corresponding to the first region and a frame portion being formed at the portion of the upper substrate corresponding to the second region;

first and second alignment layers disposed over the lower and upper substrates, respectively; and first and second polarizers disposed over rear surfaces of the lower and upper substrates, respectively, wherein an electric field perpendicular to the surface of the substrate is generated between the sheet portion of the pixel electrode and the sheet portion of the second counter electrode and at the same time, an electric field parallel to the surface of the substrate is generated between the rod portion of the pixel electrode and the first counter electrode of the frame structure.

12. The liquid crystal display as claimed in claim 11, wherein the first alignment layer is rubbed to make a selected angle with the data bus line and the second alignment layer is rubbed in the direction perpendicular to a rubbing direction of the first alignment layer.

13. The liquid crystal display as claimed in claim 12, wherein an angle made by the rubbing direction of the lower substrate and the data bus line is ±45 degrees.

14. The liquid crystal display as claimed in claim 11, wherein the first polarizer has the same polarizing axis as the rubbing direction of the first alignment layer and the second polarizer has a polarizing axis parallel to the polarizing axis of the first polarizer.

* * * * *